(12) United States Patent
Kobayashi et al.

(10) Patent No.: US 6,767,530 B2
(45) Date of Patent: Jul. 27, 2004

(54) METHOD FOR PRODUCING HYDROGEN

(75) Inventors: Hisashi Kobayashi, Putnam Valley, NY (US); Thomas Gilbert Halvorson, Lockport, NY (US)

(73) Assignee: Praxair Technology, Inc., Danbury, CT (US)

( * ) Notice: Subject to any disclaimer, the term of this patent is extended or adjusted under 35 U.S.C. 154(b) by 77 days.

(21) Appl. No.: 10/014,479

(22) Filed: Dec. 14, 2001

(65) Prior Publication Data

US 2003/0113257 A1 Jun. 19, 2003

(51) Int. Cl.$^7$ .............................. C01B 3/24; C01B 3/26
(52) U.S. Cl. ...................... 423/650; 252/373; 423/652
(58) Field of Search .................. 423/650, 651, 423/652, 659, 653, 654; 208/134; 48/198.1; 252/373

(56) References Cited

U.S. PATENT DOCUMENTS

| | | | | |
|---|---|---|---|---|
| 4,126,668 A | * | 11/1978 | Erickson | 423/657 |
| 4,702,903 A | * | 10/1987 | Keefer | 423/359 |
| 4,732,596 A | * | 3/1988 | Nicholas et al. | 62/626 |
| 4,778,670 A | * | 10/1988 | Pinto | 423/650 |
| 4,900,333 A | | 2/1990 | Bos | 48/197 |
| 5,256,172 A | * | 10/1993 | Keefer | 423/230 |
| 5,595,059 A | | 1/1997 | Huber et al. | 60/39.02 |
| 6,103,143 A | * | 8/2000 | Sircar et al. | 252/373 |
| 6,113,874 A | * | 9/2000 | Kobayashi | 423/650 |
| 6,210,157 B1 | * | 4/2001 | Kobayashi | 432/181 |
| 6,296,679 B1 | * | 10/2001 | Kato | 48/197 R |
| 6,379,645 B1 | * | 4/2002 | Bucci et al. | 423/655 |
| 2002/0142198 A1 | * | 10/2002 | Towler et al. | |
| 2003/0113257 A1 | * | 6/2003 | Kobayashi et al. | |

OTHER PUBLICATIONS

Blazek et al., "Thermochemical Recuperation and Co-Firing", Institute of Gas Technology, 4$^{th}$ U.S. Hydrogen Meeting, Mar. 25–26, 1993.
Martin, "Regenerative Ceramic Burner Technology and Utilization", Industrial Heating, pp 12–15, Nov. 1988.

* cited by examiner

*Primary Examiner*—Wayne A. Langel
(74) *Attorney, Agent, or Firm*—Donald T. Black

(57) ABSTRACT

A method for producing hydrogen in an energy efficient manner wherein steam and methane are reacted to produce synthesis gas from which hydrogen is recovered, and heat employed in the process is recovered using a defined regenerative bed system.

12 Claims, 2 Drawing Sheets

METHOD FOR PRODUCING HYDROGEN

TECHNICAL FIELD

This invention relates generally to the production of hydrogen and, more particularly, to the production of hydrogen employing an adsorption system, whereby hydrogen may be produced with improved energy efficiency.

BACKGROUND ART

Hydrogen has a large number of uses. An increasingly important use is as a clean burning fuel in a combustion reaction wherein the only byproduct is water vapor. Similarly hydrogen is used as a reactant in fuel cells for the generation of electricity, again generating only water as a byproduct. Hydrogen is also widely used as a reactant in the production of many chemicals such as ammonia, ethanol and aniline, in hydrocracking, hydroforming and hydrofining of petroleum, in the hydrogenation of vegetable oils, in the hydrogenolysis of coal, as a reducing agent for organic synthesis and metallic ores, as a fuel for rocket engines, hypersonic aircraft and for missiles, and for many other uses.

The production of hydrogen is energy intensive and any improvement in energy efficiency in the production of hydrogen is desirable.

One important method for producing hydrogen is the production of synthesis gas and the subsequent separation and recovery of the hydrogen from the synthesis gas in a pressure swing adsorption (PSA) process. In the conventional steam-methane reformer (SMR) process, a mixture of high pressure steam and methane is passed through many tubes filled with reforming catalyst. The tubes are placed in a furnace and externally fired. Heat is transferred from the external tube surface by conduction through the tube wall and then by radiation and convection to the catalyst to provide the necessary heat for endothermic reforming reactions. Due to the indirect heat transfer method used in the process, expensive alloy tubes are required to withstand the temperature exceeding 1800 F. For efficient heat transfer the furnace must operate at significantly higher temperature, causing a high flue gas temperature and a large amount of sensible heat in the flue gas. The so called tail gas from the PSA process is used as a fuel for the furnace. However, due to the large heat requirement for the furnace a significant amount of additional fuel is required. In a typical arrangement a waste heat boiler is used to recover the sensible heat and to generate steam. Some of the steam is required in the process, but a significant fraction of steam must be exported for other uses. The SMR process is both capital and energy intensive and produces export steam that must be used for other applications.

The synthesis gas generated from the SMR process is cooled and sent to a water-gas shift reactor to shift the gas composition to that with a higher hydrogen and lower carbon monoxide concentration. The product gases from the shift reactor are further cooled and water is condensed out, and then sent to an adsorption bed of a PSA process for hydrogen recovery. The PSA is a cyclic regenerative process with multiple beds undergoing high pressure adsorption and low pressure desorption cycles to process a continuous syngas feed stream. The overall hydrogen generation scheme under the current practice is complex and capital intensive.

Accordingly, it is an object of this invention to provide a method for producing synthesis gas with improved energy efficiency and lower capital cost without export steam as compared with over known syngas production systems.

It is another object of this invention to provide an integrated method for the production of hydrogen from a feed stream which has improved overall energy efficiency and lower capital cost over presently known systems.

It is yet another object of this invention to provide an integrated method for the production of hydrogen from a feed stream which operates in a cyclic regenerative mode together with a PSA process with improved overall energy efficiency and lower capital cost over presently known systems.

SUMMARY OF THE INVENTION

The above and other objects, which will become apparent to those skilled in the art upon a reading of this disclosure, are attained by the present invention which is:

A method for producing hydrogen comprising:

(A) reacting steam with a hydrocarbon feed stream in a heated regenerative reactor bed to produce hot synthesis gas and a cooled regenerative reactor bed, and cooling the hot synthesis gas in a gas cooler;

(B) passing the cooled synthesis gas through an adsorber containing adsorbent, adsorbing synthesis gas species other than hydrogen onto the adsorbent, and recovering hydrogen from the adsorber;

(C) desorbing adsorbed gas species from the adsorbent, and combusting the desorbed gas species with oxidant to produce hot combustion gas; and (D) passing the hot combustion gas through the said cooled regenerative reactor bed to produce cooled combustion gas and said heated regenerative reactor bed.

As used herein the term "regenerative bed" means a container, typically refractory-lined, having input and output means and containing material, such as granular or shaped particles or monolithic honeycomb of various metals, alumina, magnesia, or zirconia-based ceramics, which is effective in storing and transferring heat.

As used herein the term "regenerative heat recovery bed" means a regenerative bed used solely for heat storage and transfer, including condensation or vaporization of water.

As used herein the term "regenerative reactor bed" means a regenerative bed which may also be used for carrying out a chemical reaction therein. Typically a regenerative reactor bed will also contain a chemical reaction catalyst as well as the heat transfer material.

As used herein the term "synthesis gas" or "syngas" means a fluid comprised essentially of hydrogen, carbon monoxide, water vapor, and carbon dioxide, partially reacted and unreacted hydrocarbon feed species and possibly also containing incidental impurities in minor amounts not affecting the properties of the fluid.

DETAILED DESCRIPTION OF THE INVENTION

The method of this invention will be described in greater detail with reference to the Drawings.

Figure 1:
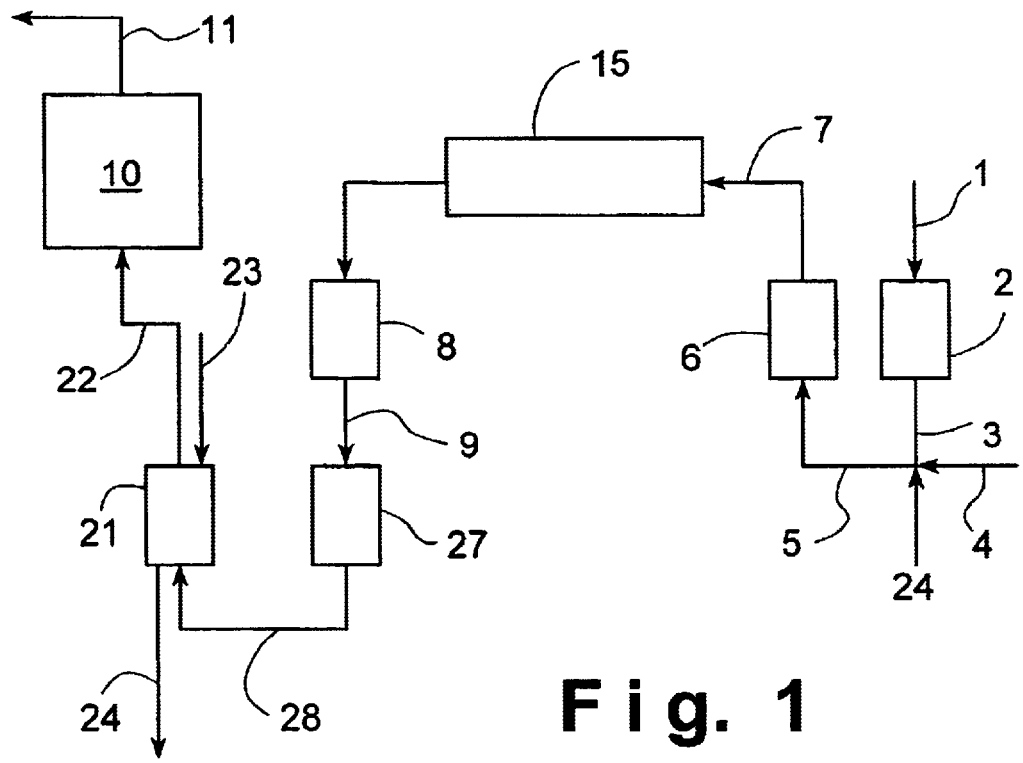
FIG. 1 illustrates an embodiment of a system useful in the practice of this invention operating in the hydrogen generation and adsorption mode.

Referring now to FIG. 1 which show the hydrogen generation and adsorption mode of operation, preferably water such as liquid water 1, is passed through hot regenerative bed 2 to form steam 3. A separate steam stream, if available, may be used bypassing the hot regenerative bed 2. A hydrocarbon feed stream 4, preferably natural gas which contains predominantly methane, is added to steam 3 to form hot reaction mixture 5 comprising predominantly steam and methane. Other hydrocarbon feed streams such as refinery byproduct gases, naphtha, and oils may be used.

Hot reaction mixture 5 is passed to heated regenerative reactor bed 6 wherein its components react in an endothermic reaction to produce hot synthesis gas 7. Optionally a small amount of oxygen containing stream 29 may be added to steam stream 3 to facilitate exothermic partial oxidation reactions of feed materials. The sensible heat required to heat the steam and hydrocarbon feed stream to the syngas reaction temperature and the endothermic nature of the synthesis gas forming reaction serves to cool bed 6 so as to produce a cooled regenerative reactor bed.

Bed 6 contains granular or shaped refractory materials or monolithic honeycomb type materials made of metals, alumina or other oxides, with or without catalysts, with a mean particle or pore diameter of about 0.05 to 2 inches. When bed 6 is designed to operate with a maximum temperature below about 2000° F., it is preferred that bed 6 contains conventional steam-methane reforming catalyst such as nickel or noble metal catalyst such as platinum. Preferably bed 6 is designed to operate with a maximum temperature in a range of about 2000° to 3000° F. It is preferred not to use conventional steam-methane reforming catalyst.

Although it is possible to bypass the furnace 15 in the hydrogen generation and adsorption cycle, it is not practical because a hot valve becomes necessary. One of the advantages, and indeed preferred aspects, of this invention is that valves are not needed and preferably are not used in high temperature streams 7, 14 and 17. In the combustion and heat recovery cycle, shown in FIG. 2, it is necessary for the tail gas 13 to pass through the furnace as it is used as the fuel for combustion.

The hot synthesis gas 7 is then passed through combustion chamber 15 and then passed through a gas cooler 8 thereby producing cooled synthesis gas stream 9. There are different methods of cooling the hot synthesis gas, including, but not limited to, the use of a feed water heater to heat feed water, a recuperator to heat combustion air, and a regenerator. Preferably, the cooler 8 through which the hot synthesis gas is passed is a first regenerative heat recovery bed 8 wherein heat from the hot synthesis gas is passed to the bed internals thereby producing cooled synthesis gas and a heated regenerative heat recovery bed.

The cooled synthesis gas 9 is then passed through an optional water-gas shift reactor 27 to increase the hydrogen content of the synthesis gas. The synthesis gas stream 28 is further passed through a second cooler/condenser 21. There are different methods of cooling and condensing water from the cooled synthesis gas stream 28, including, but not limited to, exchanging heat against the feed water to make steam for the process in a indirect heat exchanger or in a regenerator. Preferably, the cooled synthesis gas 28 is passed through the second regenerative heat recovery bed 21. Water is condensed from stream 28 and removed as condensate stream 24. In order to condense water from syngas stream 28, sufficient cooling must be provided in regenerator/condenser 21. Some of the cooling comes from the sensible heat required to heat the tail gas through bed 21. However, feed water 23 can also be used to cool and condense water. For example, if the process operates at 222 psia, the concentration of water in the syngas stream is dropped to 1 vol % at 130° F. in the cooler/condenser 21. Due to the counter current arrangement of the condenser, the temperature of condensate 24 would be hotter, on the order of 230° F. Hot condensate at pressure can be recycled during the combustion and heat recovery cycle as feed water 23 or 1. During the combustion and heat recovery cycle the combustor and regenerator pressure is dropped to near atmospheric, and hence feed water 23 will vaporize at a lower temperature, especially with the tail gas acting as diluent. (The saturation temperature at 1 atmosphere would be 106° F. for a stream composed of 50% steam and 50% tail gas.)

In this case the pressure swing has a very favorable effect on the condensation-and-vaporization cycle. Furthermore, most of the steam generated in bed 21 can be condensed in bed 2 to recover the latent heat in this scheme. In order to facilitate water vaporization in bed 2 during the hydrogen generation and adsorption cycle, natural gas can be injected with feed water 1 as a diluent. In this case, the injection of natural gas should be stopped before the end of the cycle so that the residual methane is purged from bed 2 at the end of the cycle.

Optional cooling feed water stream 23 is introduced from the top of the second regenerative heat recovery bed 21 to provide additional cooling, if required. Warm condensate water 24 is optionally recycled and used as feed water 1.

The first and the second regenerative heat recovery beds can be combined into a single unit containing two stages of regenerative beds.

The remaining stream 22 is passed through adsorber 10 containing adsorbent particles which preferentially adsorb carbon monoxide, carbon dioxide, water, methane, nitrogen, partially reacted and unreacted hydrocarbon feed materials and other gases from the synthesis gas, except hydrogen. The adsorption bed typically consists of several layers of adsorbents. Silica gel often is used as the first layer to adsorb water and carbon dioxide. Activated carbon may be used as the second layer to adsorb carbon dioxide. Type 5A or 13X molecular sieves may be used for adsorption of methane, other hydrocarbons, carbon monoxide, and nitrogen.

Hydrogen, which remains after all other gases are adsorbed onto the adsorbent particles of adsorber 10, is recovered as product in stream 11. Typically the hydrogen concentration of stream 11 is greater than 99.9 mole percent, but can be adjusted to higher or lower concentrations through appropriate adsorption bed design. The pressure of the process can be elevated to a desired level by controlling the flow rates of the feed streams 1 and 4 and product stream 11 of the process.

The method of this invention operates in the above-described hydrogen generation and adsorption mode until the adsorbent particles within adsorber 10 become saturated with carbon monoxide, carbon dioxide, water and other gases. Prior to reaching the adsorbent bed saturation point, the hydrocarbon feed stream 4 is turned off and only steam generated from feed water 1 is fed to the system to purge reactor bed 6, combustion chamber 15, and heat recovery beds 8 and 21 of syngas to prepare for the next cycle. At this point the method of this invention switches to operation in the combustion and heat recovery mode which is illustrated with reference to FIG. 2.

Figure 2:
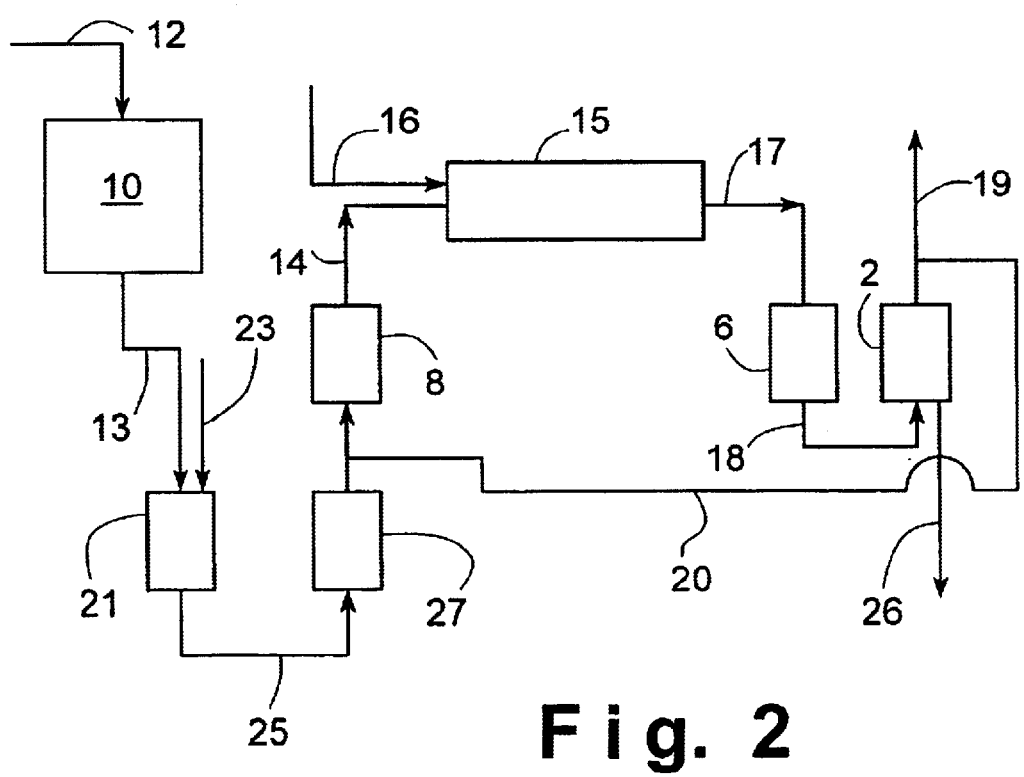
FIG. 2 illustrates the system illustrated in FIG. 1 operating in the combustion and heat recovery mode.

Referring now to FIG. 2, the pressure in the adsorber 10 is reduced to facilitate the desorption process. Purge gas 12, which is a portion of product hydrogen 11 (so called back purging), is optionally passed into and through adsorber 10 wherein carbon monoxide, carbon dioxide and other adsorbed gases are desorbed from the adsorbent particles into the purge gas. If the hydrogen generation and adsorption mode was operated under an elevated pressure, the pressure reduction step can be achieved by providing a valve (not shown) in the flue gas stream 19, opening it, and venting to the atmosphere. If the hydrogen generation and recovery mode was operated below atmospheric pressure or moderately above atmospheric pressure, a vacuum pump (not shown) may be provided in stream 13 and used to reduce pressure and pump out the adsorbed gases.

The resulting carbon monoxide containing purge gas is withdrawn from adsorber 10 and forms so called "tail gas" stream 13 and is preferably passed through the second regenerative heat recovery bed 21, optional shift reactor 27 and regenerative heat recovery bed 8 which had been heated as was previously described. Optional feed water stream 23 may be fed to second regenerative heat recovery bed 21 to generate steam which is then added to and dilutes tail gas stream 13. The passage of stream 25 through bed 8 causes heat to transfer from bed 8 into stream 25 resulting in heated carbon monoxide containing tail gas and a cooled regenerative heat recovery bed 8.

The heated carbon monoxide containing tail gas is passed in stream 14 from regenerative heat recovery bed 8 into furnace 15. Oxidant 16 such as air, oxygen-enriched air having an oxygen content of greater than 25 mol %, oxygen containing hot combustion gases such as gas turbine exhaust gas having oxygen content greater than 10% or commercially pure oxygen having an oxygen content greater than 99 mol % is also passed into furnace 15 wherein the oxidant combusts with the heated carbon monoxide containing purge gas to form hot combustion products. Preferably oxidant 16 is air. In order to facilitate stable combustion of tail gas stream 14 and oxidant 16, both streams are first introduced into a burner (not shown) attached to furnace 15. Furnace 15 is sized to combust preheated tail gas stream 14 and to produce hot combustion products typically comprising carbon dioxide, water vapor, and nitrogen. Changes in the composition of the tail gas can be accommodated by controlling the amount of excess combustion air fed into the combustion stage or the amount of optional feed water 23 so as to maintain an optimum combustor temperature.

As an alternative to the conventional burner and furnace arrangement for combustion, a catalytic combustion method, in which combustion reactions take place in bed 6, is preferred when the regenerative bed 6 contains steam-methane reforming catalyst such as nickel or noble metal catalyst such as platinum. Combustion catalyst such as platinum may be used for duel purpose of reforming and combustion. The size of furnace 15 is substantially reduced or eliminated and tail gas stream 14 and oxidant 16 are rapidly mixed before entering into bed 6. When a catalytic combustion method is used, it is important to control the flame temperature of the combustion mixture so as not to overheat the catalyst.

In order to modulate the temperature of combustion products and also to fully recover the heat stored in regenerative heat recovery bed 8, optional stream 20 which comprises a portion of flue gas stream 19 may be fed into first regenerative heat recovery bed 8 with stream 25.

Preferably, the tail gas stream is enriched by adding to it natural gas (not shown), so that upon combustion of the natural gas-enhanced tail gas stream additional heat is provided for regeneration of beds 2 and 6. This can reduce or avoid the need for providing such additional heat by reducing the steam-to-methane ratio or by increasing back purging of hydrogen.

Hot combustion products are passed from furnace 15 in stream 17 to and then through regenerative reactor bed 6 which had been cooled as was previously described. The passage through the cooled regenerative reactor bed serves to transfer heat from the hot combustion gas to the internals of the bed 6 resulting in the production of cooled combustion gas and the heated regenerative reactor bed 6 used in the other operating mode of the process.

To avoid overheating of the bed 6, it is preferred that the temperature of bed 6 not exceed about 3200° F., preferably not to exceed 2800 F. Temperature control can be provided by adding to the gas in stream 17 a cooler gas such as combustion air, steam, or a stream obtained by recycling a portion of stream 19.

The cooled combustion gas 18 from regenerative reactor bed 6 is preferably further cooled by passage through regenerative bed 2 to produce the aforesaid hot regenerative bed 2 used in the hydrogen generation and adsorption mode of the process, and the resulting further cooled combustion gas is withdrawn in stream 19 for disposal or further processing. Water contained in stream 17 is preferably condensed and removed as condensate 26. Condensate 26 may be recycled and used as feed water 1. Prior to completing the combustion and heat recovery mode of process operation, the flows of combustion air 16 and tail gas 13 are preferably shut off and the system is purge with steam generated from feed water 23 in order to remove the residual combustion products in the system.

If the steam-to-methane ratio is too low, there is a risk of coking occurring in the reactor. This risk can be avoided by providing a ratio of about 3 or higher. If coking occurs, it can be removed by interrupting methane injection and feeding a small amount of oxygen or air to the steam mixture to "burn out" coke residues.

Figure 3:
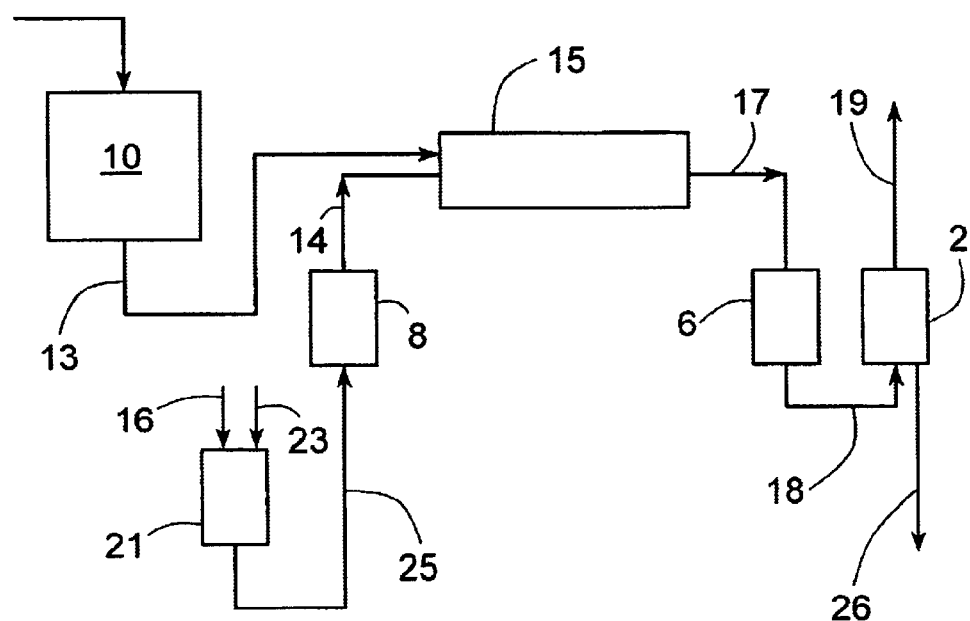
FIG. 3 illustrates an alternate system operating in the combustion and heat recovery mode.

An alternative combustion and heat recovery mode is illustrated in FIG. 3. Referring now to FIG. 3, the pressure of the adsorber bed 10 is reduced and optional purge gas 12 is passed into and through adsorber bed 10 wherein carbon monoxide, carbon dioxide and other adsorbed gases are desorbed from the adsorbent particles into the purge gas. The pressure in the adsorber 10 is reduced to facilitate the desorption process. By providing and using appropriate valves (not shown) tail gas stream 13 bypasses regenerative heat recovery bed 21, optional shift reactor 27 and regenerative heat recovery bed 8 and is fed directly into the furnace 15. Combustion air feed stream 16 and optional feed water 23 are in this embodiment passed through regenerative heat recovery bed 21 and regenerative heat recovery bed 8 which had been heated as was previously described. The passage of combustion air stream 16 and optional feed water 23 through beds 21 and 8 causes heat to transfer from bed 21 into stream 25 and from bed 8 into stream 14 resulting in heated combustion air, optionally containing steam generated from feed water 23.

The heated combustion air optionally containing steam is passed in stream 14 from regenerative heat recovery bed 8 into furnace 15. Tail gas stream 13 and oxidant stream 14 are mixed in an appropriate burner (not shown) to produce hot combustion products typically comprising carbon dioxide, water vapor, and nitrogen. In order to modulate the temperature of the combustion products and also to fully recover the heat stored in regenerative heat recovery bed 8, steam and excess combustion air may be used.

As in the embodiment shown in FIG. 2, hot combustion products are passed from furnace 15 in stream 17 to and then through regenerative reactor bed 6 which had been cooled as was previously described. The passage through the cooled regenerative reactor bed serves to transfer heat from the hot combustion gas to the internals of the bed 6 resulting in the production of cooled combustion gas and the heated regenerative reactor bed 6 used in the other operating mode of the process. The cooled combustion gas 18 from regenerative reactor bed 6 is preferably further cooled by passage through regenerative bed 2 to produce the aforesaid hot regenerative bed 2 used in the other operating mode of the process, and the resulting further cooled combustion gas is withdrawn in stream 19 for disposal or further processing. Water contained in stream 17 is preferably condensed and removed as condensate 26. Condensate 26 may be recycled and used as feed water 1. Prior to completing the combustion and heat recovery mode of process operation, the flows of combustion air 16 and tail gas 13 are preferably shut off and the system is purged with steam generated from feed water 23 in order to remove the residual combustion products in the system.

The method of this invention continues operating in the combustion and heat recovery mode until essentially all of the recoverable carbon monoxide has been purged from adsorber 10, at which time the operation switches to the hydrogen generation and adsorption mode. Preferably, in order to continually produce hydrogen product, two or more systems are operated in sequence. When one system is operating in the hydrogen generation and adsorption mode another system is operating in the combustion and heat recovery mode, and at the appropriate time both systems switch to the respective other operating mode.

Those skilled in the art will recognize the importance of properly balancing the heat input and output of each process unit. For example, the ratio of steam to methane can be adjusted by controlling the feed rates of streams 1 and 3. In order to produce more hydrogen and also to prevent formation of carbonaceous residues in reactor bed 6, a minimum steam to methane mole ratio of 1:1, preferably 2:1, and most preferably 3:1 is established.

The heat required for the generation of syngas during the hydrogen generation and adsorption mode must be supplied by combustion of tail gas during the combustion-heat recovery mode. If the amount of heat generated in the combustion and heat recovery mode is not sufficient, the feed rate of steam and hence the ratio of steam to methane may be reduced. When further reduction of steam causes a carbon deposition (coking) problem, then the volume of the tail gas may be increased by a greater amount of hydrogen back purging in the adsorption bed 10 or preferably by adding natural gas or other fuel to the tail gas stream 14. The heat transfer in regenerative heat recovery beds 8 and 21 can be balanced by controlling the amount of feed water 23 and recycled flue gas 20 in the embodiment of FIG. 2 or by controlling the amount of feed water 23 and combustion air 16 in the embodiment of FIG. 3.

In order to maximize the overall thermal efficiency of the process, it is desirable to recover the latent heat of water vapor in regenerative heat recovery beds 2 and 21. Both chilled feed water and warm feed water recycled from condensates 24 and 26, after appropriate filtration and feed water treatment, may be used in two stages so as to balance the heat requirements as well as to improve the heat recovery efficiencies.

Although the invention has been described in detail with reference to a certain preferred embodiment, those skilled in the art will recognize that there are other embodiments of the invention within the spirit and the scope of the claims.

What is claimed is:

1. A method for producing hydrogen comprising:

(A) reacting steam with a hydrocarbon feed stream in a heated regenerative reactor bed to produce hot synthesis gas and a cooled regenerative reactor bed, and cooling the hot synthesis gas in a gas cooler to produce cooled synthesis gas;

(B) passing the cooled synthesis gas through an adsorber containing adsorbent, adsorbing synthesis gas species other than hydrogen onto the adsorbent, and recovering hydrogen from the adsorber;

(C) desorbing adsorbed gas species from the adsorbent, and combusting the desorbed gas species with oxidant to produce hot combustion gas; and (D) passing the hot combustion gas through the said cooled regenerative reactor bed to produce cooled combustion gas and said heated regenerative reactor bed.

2. The method of claim 1 wherein the steam is produced by heating water in a hot regenerative bed.

3. The method of claim 2 wherein the hot regenerative bed is produced by passing combustion gas therethrough after the said passage of the hot combustion gas through the cooled regenerative reactor bed.

4. The method of claim 1 wherein said heated regenerative bed is produced by catalytically combusting said desorbed gas species with oxidant in the cooled regenerative bed.

5. The method of claim 1 wherein the hot synthesis gas is passed through a furnace prior to the said cooling of the hot synthesis gas in the regenerative heat recovery bed.

6. The method of claim 1 wherein the hot synthesis gas is cooled by passing it through a regenerative heat recovery bed to produce cooled synthesis gas and a heated regenerative heat recovery bed.

7. The method of claim 1 wherein the adsorbed gases are desorbed from the adsorbent by passing purge gas through the adsorbent.

8. The method of claim 1 wherein the desorbed gases, prior to combustion, are heated in a heated regenerative heat recovery bed.

9. The method of claim 1 wherein the oxidant is a fluid having an oxygen concentration of at least 10 mole percent.

10. The method of claim 1 wherein a portion of water contained in the cooled synthesis gas in condensed in a second regenerative heat recovery bed.

11. The method of claim 1 where the cooled synthesis gas passed through a shift reactor to increase the concentration of hydrogen therein.

12. The method of claim 1 wherein a portion of water contained in the cooled synthesis gas is condensed in a second regenerative heat recovery bed at a first pressure and water is vaporized during the regeneration step at a pressure lower than the first pressure.

* * * * *